(12) United States Patent
Singer et al.

(10) Patent No.: US 10,797,359 B2
(45) Date of Patent: Oct. 6, 2020

(54) COOLED CONTAINMENT COMPARTMENTS FOR PACKAGED BATTERY CELLS

(71) Applicant: INTERNATIONAL BUSINESS MACHINES CORPORATION, Armonk, NY (US)

(72) Inventors: Noah Singer, New City, NY (US); John Torok, Poughkeepsie, NY (US); Robert B. Schlak, Hyde Park, NY (US); Xiaojin Wei, Poughkeepsie, NY (US); Mitchell Zapotoski, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/439,906

(22) Filed: Jun. 13, 2019

(65) Prior Publication Data

US 2019/0296402 A1 Sep. 26, 2019

Related U.S. Application Data

(63) Continuation of application No. 15/800,303, filed on Nov. 1, 2017, now Pat. No. 10,374,264, which is a
(Continued)

(51) Int. Cl.
*H01M 10/42* (2006.01)
*H01M 10/6563* (2014.01)
(Continued)

(52) U.S. Cl.
CPC ..... *H01M 10/4257* (2013.01); *H01M 10/425* (2013.01); *H01M 10/4207* (2013.01);
(Continued)

(58) Field of Classification Search
CPC ......... H01M 10/4257; H01M 10/4207; H01M 10/6556; H01M 10/6561; H01M 2010/4271
(Continued)

(56) References Cited

U.S. PATENT DOCUMENTS 5,314,765 A 5/1994 Bates
5,998,967 A 12/1999 Umeki et al.
(Continued)

FOREIGN PATENT DOCUMENTS

| CN | 104467042 A | 3/2015 |
|---|---|---|
| WO | 2007112116 A2 | 10/2007 |
| WO | 2015130746 A1 | 9/2015 |

OTHER PUBLICATIONS

IBM, List of IBM Patents or Patent Applications Treated as Related, Appendix P, dated , Jun. 14, 2019, 2 pages.
(Continued)

*Primary Examiner* — Gary D Harris
(74) *Attorney, Agent, or Firm* — Tihon Poltavets

(57) ABSTRACT

An air plenum assembly includes a first plenum for cooling, where the first plenum includes an inlet for air intake located at a first side of the first plenum. The air plenum assembly further includes a second plenum for exhausting heated air, where the second plenum includes an outlet for exhausting air located at a first side of the second plenum. The air plenum assembly further includes a first aperture located on a first side of the first plenum for directing air from the inlet at the first side of the first plenum to a first compartment and includes a first vent located on a first side of the second plenum for exhausting air away from the first compartment towards the outlet at the first side of the second plenum. The first compartment is isolated from surrounding battery compartments by at least two thermal separators.

18 Claims, 6 Drawing Sheets

Related U.S. Application Data continuation of application No. 15/682,578, filed on Aug. 22, 2017, now Pat. No. 10,374,263.

(51) Int. Cl.
*H01M 10/6554* (2014.01)
*H01M 10/6566* (2014.01)
*H01M 10/6556* (2014.01)
*H01M 10/6561* (2014.01)
*H01M 10/6557* (2014.01)
*H01M 10/653* (2014.01)

(52) U.S. Cl.
CPC ... *H01M 10/6554* (2015.04); *H01M 10/6556* (2015.04); *H01M 10/6561* (2015.04); *H01M 10/6563* (2015.04); *H01M 10/6566* (2015.04); *H01M 10/653* (2015.04); *H01M 10/6557* (2015.04); *H01M 2010/4271* (2013.01)

(58) Field of Classification Search
USPC .......................................................... 429/407
See application file for complete search history.

(56) References Cited

U.S. PATENT DOCUMENTS

| | | |
|---|---|---|
| 6,080,508 A | 7/2000 | Dasgupta et al. |
| 8,652,678 B2 | 2/2014 | Musetti |
| 8,932,739 B2 | 1/2015 | Hermann et al. |
| 9,093,726 B2 | 7/2015 | Prilutsky et al. |
| 9,166,259 B2 | 10/2015 | Ronning et al. |
| 9,548,616 B2 | 1/2017 | Hermann |
| 2006/0093901 A1 | 5/2006 | Lee |
| 2008/0280192 A1 | 11/2008 | Drozdz et al. |
| 2010/0183910 A1 | 7/2010 | Nishino et al. |
| 2011/0020678 A1 | 1/2011 | Straubel et al. |
| 2011/0101919 A1 | 5/2011 | Polk et al. |
| 2011/0281152 A1 | 11/2011 | He et al. |
| 2014/0072844 A1 | 3/2014 | Oh |
| 2015/0111082 A1 | 4/2015 | Sumpf et al. |
| 2015/0244036 A1 | 8/2015 | Lane |
| 2015/0342092 A1 | 11/2015 | Ramm et al. |
| 2017/0033420 A1* | 2/2017 | Dudley ............. H01M 10/6557 |
| 2019/0067749 A1 | 2/2019 | Singer et al. |
| 2019/0067750 A1 | 2/2019 | Singer et al. |

OTHER PUBLICATIONS

International Search Report and Written Opinion, International application No. PCT/IB2018/055960, International filing date: Aug. 8, 2018. dated Dec. 9, 2018, pp. 1-9.

Mi et al., "Advanced Electro-Thermal Modeling of Lithium-Ion Battery System for Hybrid Electric Vehicle Applications", 2007 IEEE, pp. 107-111.

* cited by examiner

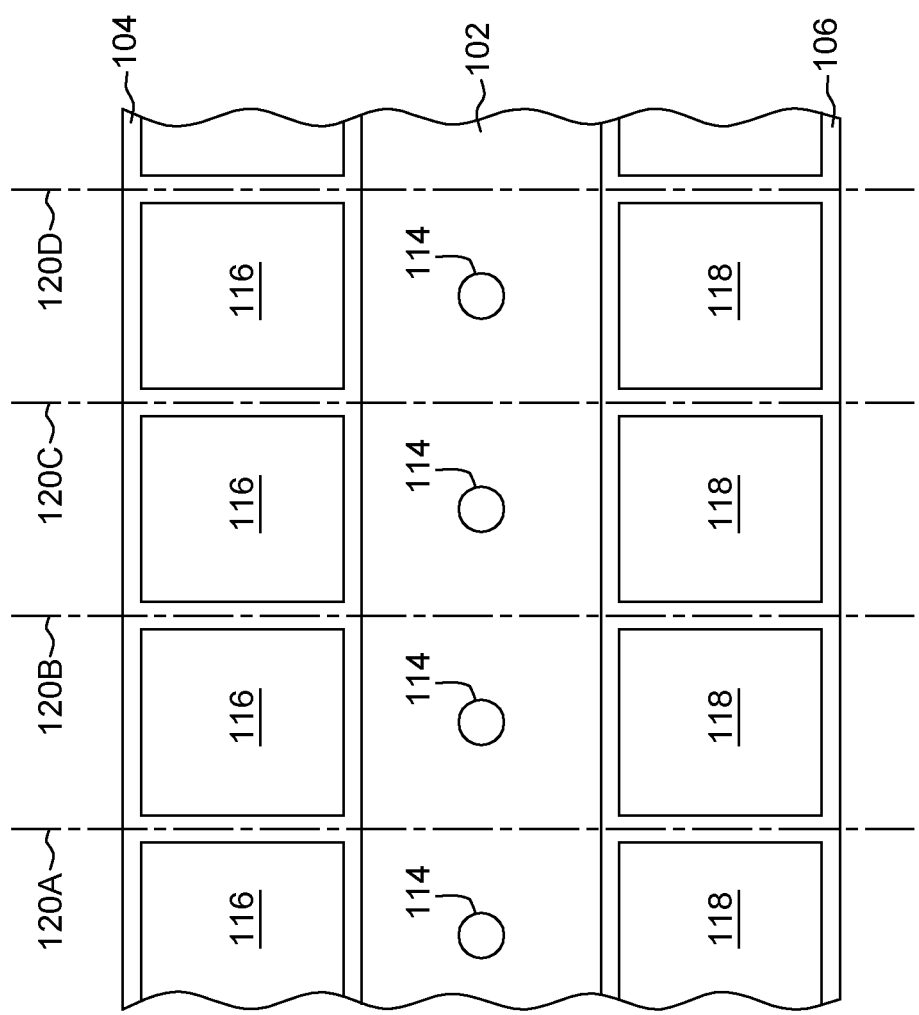

_US 10,797,359 B2_

COOLED CONTAINMENT COMPARTMENTS FOR PACKAGED BATTERY CELLS

FIELD OF THE INVENTION

This disclosure relates generally to packaged battery cells, and in particular, to structures for cooling and containing individual packaged battery cells.

BACKGROUND OF THE INVENTION

Over time, energy density in batteries has increased, while packaging size for the batteries has decreased. Lithium ion batteries are an example of high energy density batteries and have become the preferred battery technology for items such as, consumer electronics, electric vehicles, battery backup systems, and other energetic systems requiring a mobile and rechargeable power source. A byproduct of high energy density is that lithium ion batteries pose a greater safety risk than lower energy density technologies, due to the amount of chemical energy stored in a small package. A mechanism by which high energy density batteries fail energetically is called thermal runaway, a condition where the chemical reaction inside a single cell becomes unstable due to excessive heat which may be generated by an internal defect or by other means. Thermal runaway causes the single cell to continue to heat up at an ever-accelerating rate until the structural integrity of the single cell is compromised or the single cell combusts.

SUMMARY

One aspect of an embodiment of the present invention discloses an apparatus for an air plenum assembly comprising a first plenum enclosed by a first conduit for cooling, wherein the first plenum includes an inlet for air intake located at a first side of the first plenum; a second plenum enclosed by a second conduit for exhausting heated air, wherein the second plenum includes an outlet for exhausting air located at a first side of the second plenum, wherein a second side of the first plenum is at least partially coupled lengthwise to a second side of the second plenum; a first aperture located on a third side of the first plenum for directing air from the inlet at the first side of the first plenum to a first compartment, wherein the first compartment includes a first battery cell; and a first vent located on a third side of the second plenum for exhausting air away from the first compartment towards the outlet at the first side of the second plenum.

BRIEF DESCRIPTION OF THE SEVERAL VIEWS OF THE DRAWINGS

The following detailed description, given by way of example and not intended to limit the disclosure solely thereto, will best be appreciated in conjunction with the accompanying drawings, in which:

FIG. 1B depicts an enhanced view of a portion of the air plenum assembly of FIG. 1A, in accordance with an embodiment of the present invention.

DETAILED DESCRIPTION

Figure 1A:
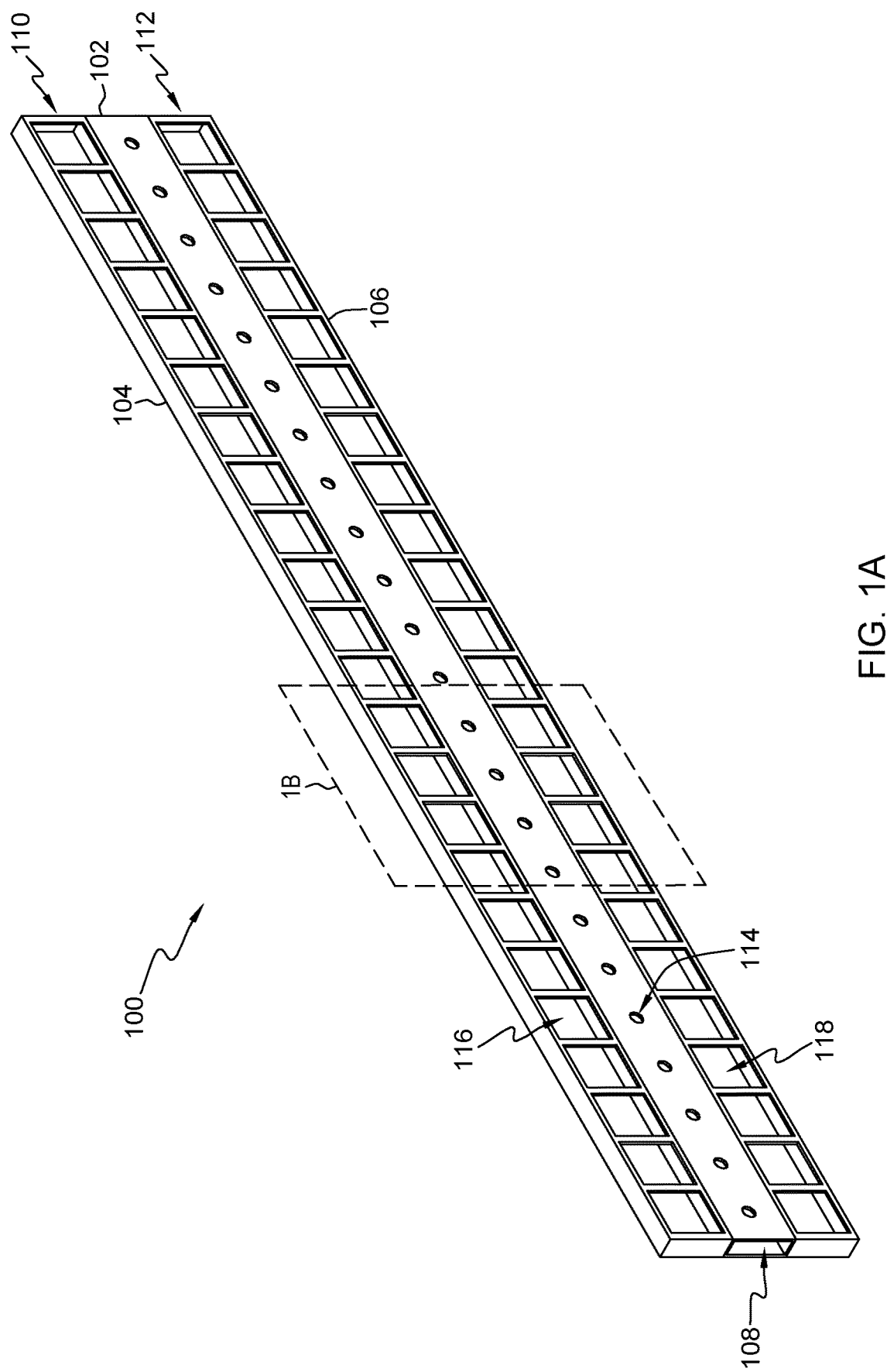
FIG. 1A depicts an air plenum assembly, in accordance with an embodiment of the present invention.

The cooling of battery cells prevents battery cell overheating during charging and discharging which can lead to thermal runaway. Additionally, the cooling of battery cells removes excess heat during certain events, such as small internal shorts, which may not result in thermal runaway. The containment of battery cells prevents an uncontrolled event (e.g., fire) from exiting the battery cell package and causing damage or injury. The containment of a single battery cell prevents a single battery cell thermal runaway event from propagating to surrounding battery cells and creating a thermal runaway event across all the battery cells within the battery cell package.

Smaller battery cell packages, such as those found in smart phones, are typically cooled using conduction and natural convection. These battery cell packages may also utilize a containment unit which encases the battery cells, where the containment unit is tight against the cells and is thermally coupled to the battery cells. The containment units prevent damage due to an uncontrolled event or thermal runaway, and also assist with the cooling via conduction and natural convection.

However, conduction and natural convention may not provide enough cooling to larger battery cell packages. Larger battery cell packages are typically cooled utilizing a liquid coolant, where the coolant flows through tubing and piping around the battery cells to cool the battery cell package. The coolant draws heat away from the battery cells and allows for a containment unit to be placed around the cells to prevent a thermal runaway event from escaping the confines of the battery cell package. Some larger battery cell packages separate the battery cells into smaller clusters or modules which are isolated, preventing a cascading failure of all the battery cells in the battery cell package. Additionally, fire proofing material is utilized around the battery cells to absorb energy during a thermal runaway event, which is meant to prevent propagation of failure from battery cell to battery cell. The battery cell package must accommodate the combination of the liquid cooling system and the fire proofing material, resulting in a larger battery cell package. However, liquid cooling systems typically require extra space within the battery cell package for the coolant tubing and piping, and can add manufacturing complexity.

Embodiments of the present invention are directed to systems that allow for forced air cooling in larger battery cell packages, while maintaining single battery cell containment for prevention of propagated thermal runaway from battery cell to battery cell in a battery cell package. The forced air cooling is provided by a fan located at the front of the battery cell package, where air is drawn through an inlet on the front surface of the battery cell package. The air is forced towards an air plenum assembly which includes a designated cooling plenum and exhaust plenum, where the forced air enters an inlet of the cooling plenum. The cooling plenum includes a plurality of apertures for dispersing the forced air into each battery compartment, where a single battery compartment includes a single battery cell. Additionally, each battery compartment includes thermal separators made of an electrically non-conductive heat resistant and high melting point material to prevent propagated thermal runaway from battery cell to battery cell. The induced air pressure gradient in each of the battery compartments due to the forced air entering each battery compartment allows for the heated air to exhaust through a vent into the exhaust plenum. The heated air travels through the exhaust plenum and out the rear of the battery cell package, where the rear surface of the battery cell package includes a vent for exhausting the heated air. Advantages of the present invention may include a lower space requirement in the battery cell packages for the plenum assembly as opposed to the coolant tubing and piping required for a liquid cooled system, less manufacturing complexity, and lower manufacturing cost.

Detailed embodiments of the present invention are disclosed herein with reference to the accompanying drawings; however, it is to be understood that the disclosed embodiments are merely illustrative of potential embodiments of the invention and may take various forms. In addition, each of the examples given in connection with the various embodiments is also intended to be illustrative, and not restrictive. This description is intended to be interpreted merely as a representative basis for teaching one skilled in the art to variously employ the various aspects of the present disclosure. In the description, details of well-known features and techniques may be omitted to avoid unnecessarily obscuring the presented embodiments.

FIG. 1A depicts an air plenum assembly, in accordance with an embodiment of the present invention. In this embodiment, air plenum assembly 100 includes cooling plenum 102, top exhausting plenum 104, and bottom exhausting plenum 106. Cooling plenum 102 enclosed by a conduit for cooling includes inlet 108, where cooled or ambient air is forced through inlet 108 of cooling plenum 102. Air intake through inlet 108 occurs at one end of cooling plenum 102 and cooling plenum 102 is sealed at the other end, opposite inlet 108. Top exhausting plenum 104 enclosed by a conduit for exhausting heated air includes top outlet 110 and bottom exhausting plenum 106 enclosed by a conduit for exhausting heated air includes bottom outlet 112, where heated air is evacuated from each of the battery cells and exhausted through top outlet 110 and bottom outlet 112. In an alternative embodiment, air plenum assembly 100 can include cooling plenum 102 and top exhausting plenum 104 or cooling plenum 102 and bottom exhausting plenum 106. Additionally, air plenum assembly 100 can include multiple cooling plenums 102, to maximize an amount of cooled or ambient air directed towards the battery cells. Top exhausting plenum 104 is at least partially coupled to a top portion of cooling plenum 102 and bottom exhausting plenum 106 is at least partially coupled to a bottom portion of cooling plenum 102.

Cooling plenum 102 includes a plurality of apertures 114 through which cooled or ambient air forced through inlet 108 is directed into each battery compartment housing a battery cell. Top exhausting plenum 104 includes a plurality of top vents 116 and bottom exhausting plenum 106 includes a plurality of bottom vents 118. In addition to aperture 114, each compartment housing the battery cell includes top vent 116 and bottom vent 118 for evacuating heat from each of the battery cells. As cooled or ambient air is forced through inlet 108, the air travels through the length of cooling plenum 102 and a portion of the air is forced through each of the apertures 114. In this embodiment, cooling plenum 102 is a rectangular shaped conduit extending the full length of air plenum assembly 100. In another embodiment, cooling plenum 102 gradually tapers towards the far end of air plenum assembly 100 opposite inlet 108, where a passage area for the cooled or ambient air force through cooling plenum 102 is greatest near inlet 108. Tapering the passage area for the cooled or ambient air through cooling plenum 102 allows for an acceleration of the cooled or ambient airflow towards the far end of cooling plenum. Additionally, the passage area can vary in size at different points along cooling plenum 102 to control the velocity of the cooled or ambient air. In yet another embodiment, top exhausting plenum 104 and bottom exhausting plenum 106 can each gradually taper towards the far end of air plenum assembly 100 opposite top outlet 110 and bottom outlet 112, respectively, where a passage area for the heated air through top exhausting plenum 104 and bottom exhausting plenum 106 is greatest near top outlet 110 and bottom outlet 112, respectively. As described with regards to cooling plenum 102, the passage area can vary in size at different points along top exhausting plenum 104 and bottom exhausting plenum 106 to control the velocity of the exhausted heated air.

FIG. 1B depicts an enhanced view of a portion of the air plenum assembly of FIG. 1A, in accordance with an embodiment of the present invention. In this embodiment, each of the plurality of top vents 116 and each of the plurality of bottom vents 118 have the same dimensions. A single battery cell is situated in a single battery compartment, where the single battery compartment includes a single aperture 114, top vent 116, and bottom vent 118. The single battery compartment is partially enclosed, where the only openings for the single battery compartment is aperture 114, top vent 116, and bottom vent 118. The dimensions, shape, and location of each of the plurality of top vents 116 and each of the plurality of bottom vents 118 can vary depending on exhaust requirements for each of the battery cells. In this embodiment, the dimensions and shape of top vents 116 and bottom vents 118 are such to maximize the passage area for exhausting air from each of the single battery compartments.

In this embodiment, each of the plurality of apertures 114 have the same dimensions. The dimensions, shape, and location of each of the plurality of apertures 114 can vary depending on cooling requirements for each of the battery cells. For example, a cooling requirement can include a location of aperture 114 for equally impinging the forced air onto battery cell. Another cooling requirement can include a location of aperture 114 for creating a maximum amount of induced air pressure gradient to evacuate heat at a greater rate through top vent 116 and bottom vent 118 out of the single battery compartment and away from the battery cell. The single battery compartment is not limited to a single aperture 114 and can include two or more apertures 114.

In this embodiment, center line 120A, 120B, 120C, and 120D represents center lines to which thermal separators align with. A first thermal separator aligns with center line 120A for a total height of air plenum assembly 100, which equals the sum of the height of cooling plenum 102, top exhausting plenum 104, and bottom exhausting plenum 106. A second thermal separator aligns with center line 120B, where an area between the first thermal separator and the second thermal separator represent two walls of battery compartment 124 for a single battery cell.

Figure 2:
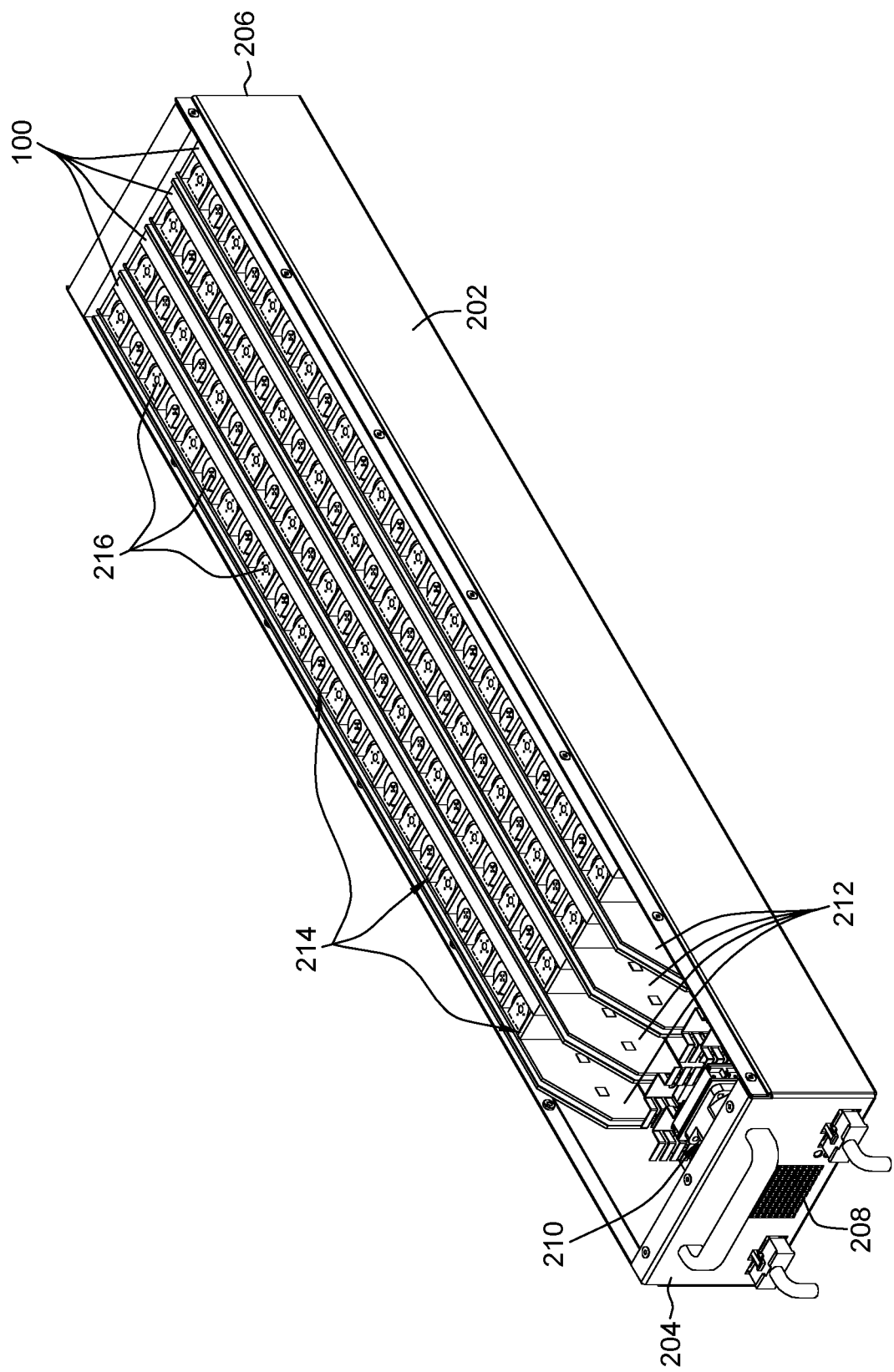
FIG. 2 depicts an isometric view of a plurality of air plenum assemblies in a battery cell package, in accordance with one embodiment of the present invention.

FIG. 2 depicts an isometric view of a plurality of air plenum assemblies in a battery cell package, in accordance with one embodiment of the present invention. In this embodiment, battery cell package 200 includes enclosure 202, where a top portion of enclosure 202 is removable to expose the internal components of battery cell package 200. Enclosure 202 includes front portion 204 and rear portion 206, where front portion 204 includes inlet aperture 208 for air intake by fan 210. Fan 210 accelerates air towards air plenum assemblies 100 and printed circuit board assemblies 212. In this embodiment, there are four air plenum assemblies 100 and four printed circuit board assemblies 212. Each printed circuit board assembly 212 includes a row of coupled thermal separators 214 between each of the electrically coupled battery cells 216. Circuit board assembly 212 can include one or more battery cells 216 and two or more thermal separators 214, where each battery cell 216 includes two thermal separators 214 on both sides of each battery cell 216. Each printed circuit board assembly 212 also includes a designated air plenum assembly 100 for cooling the row of battery cells 216 electrically coupled to each printed circuit board assembly 212.

Figure 3:
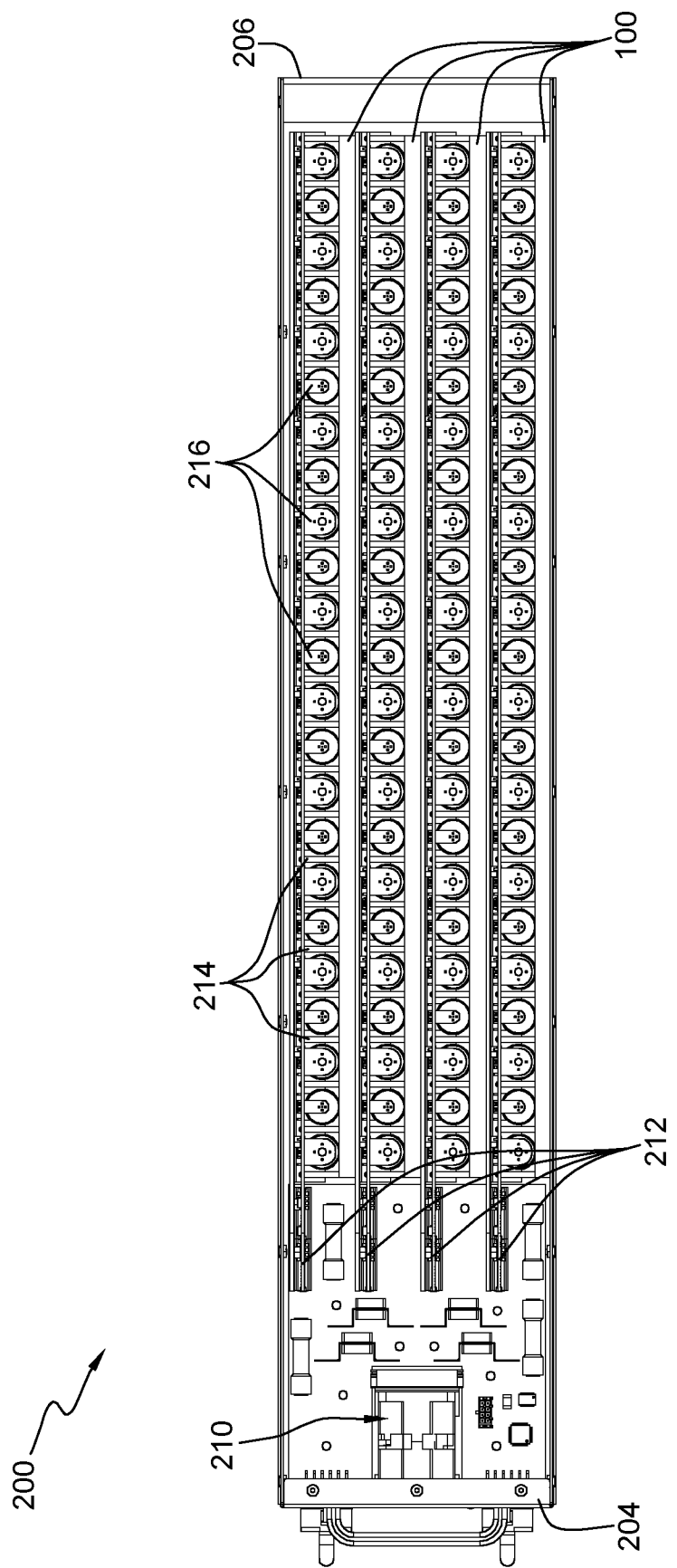
FIG. 3 depicts a top view of the plurality of air plenum assemblies in the battery cell package of FIG. 2, in accordance with one embodiment of the present invention.

FIG. 3 depicts a top view of the plurality of air plenum assemblies in the battery cell package of FIG. 2, in accordance with one embodiment of the present invention. In this embodiment, fan 210 located at front portion 204 of battery cell package 200 is centered between the four air plenum assemblies and the four printed circuit board assemblies 212 to allow for the symmetrical air distribution. Each printed circuit board assembly 212 is parallel to each respective air plenum assembly 100. Each battery cell 216 is encased lengthwise by air plenum assembly 100, printed circuit board assembly 212, and two thermal separators 214. Thermal separators 214 are made from an electrically nonconductive heat resistant, high strength, and high melting point material, relative to each battery cell 216. The melting point temperature of thermal separators 214 is greater than temperatures experienced by battery cell 216 during a thermal runaway event to ensure each battery cell 216 is contained in each batter compartment.

In this embodiment, a first thermal separator 214 is located opposite and in parallel to a second thermal separator 214. Printed circuit board assembly 212 is located perpendicular at one end of the two thermal separators 214 and air plenum assembly 100 is located perpendicular at another end of two thermal separators 214, opposite printed circuit board assembly 212. Each battery cell 216 is encased widthwise by a bottom cover and a top cover of battery cell package 200, where the bottom cover and the top cover is located perpendicular to the first thermal separator 214 and the second thermal separator 214. The bottom cover of battery cell package 200 creates a first seal between the first thermal separator 214 and the second thermal separator 214 and the top cover of battery cell package 200 creates a second seal between the first thermal separator 214 and the second thermal separator 214.

Figure 4:
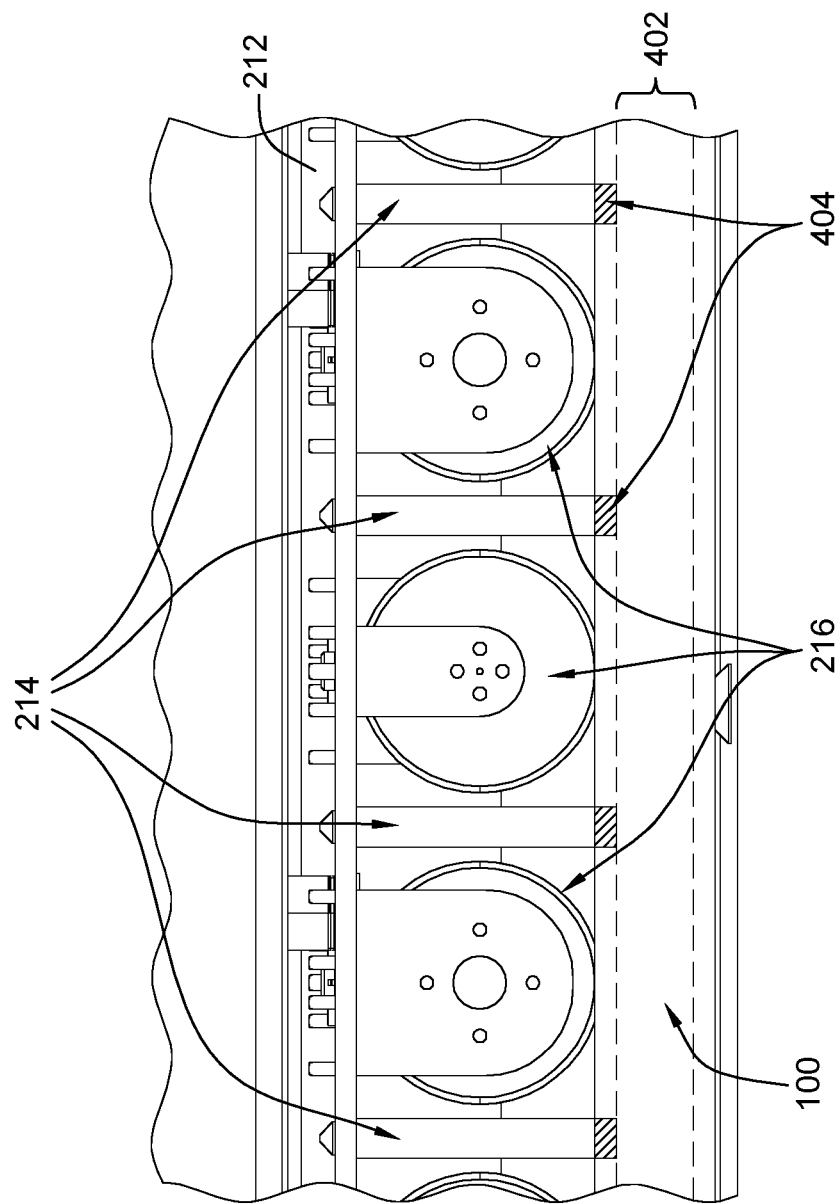
FIG. 4 depicts an enhanced top view of a single row of battery cells with an air plenum assembly in the battery cell package of FIG. 2, in accordance with one embodiment of the present invention.

FIG. 4 depicts an enhanced top view of a single row of battery cells with an air plenum assembly in the battery cell package of FIG. 2, in accordance with one embodiment of the present invention. In this embodiment, each battery cell 216 is orientated 180 degrees from an adjacent battery cell 216 that is electrically coupled to printed circuit board assembly 212. Each battery cell 216 shares at least one thermal separator with a neighboring battery cell 216. As illustrated, air plenum assembly 100 includes inner conduit 402 through which heated air is evacuated through an exhaust plenum. Walls 404 of exhaust plenum align and couple with thermal separators 214 to encase each battery cell 216, such that heated air is forced into inner conduit 402 of air plenum assembly 100 and evacuated through the exhaust plenum. In another embodiment, each wall 404 can extend beyond the width of each thermal separator 214 to restrict the amount of heated air forced into inner conduit 402 of air plenum assembly 100. Thermal separators 214 and air plenum assembly 100 prevents air in one battery compartment from entering another battery compartment, resulting in isolation for prevention of thermal runaway propagation from battery cell to battery cell.

Figure 5:
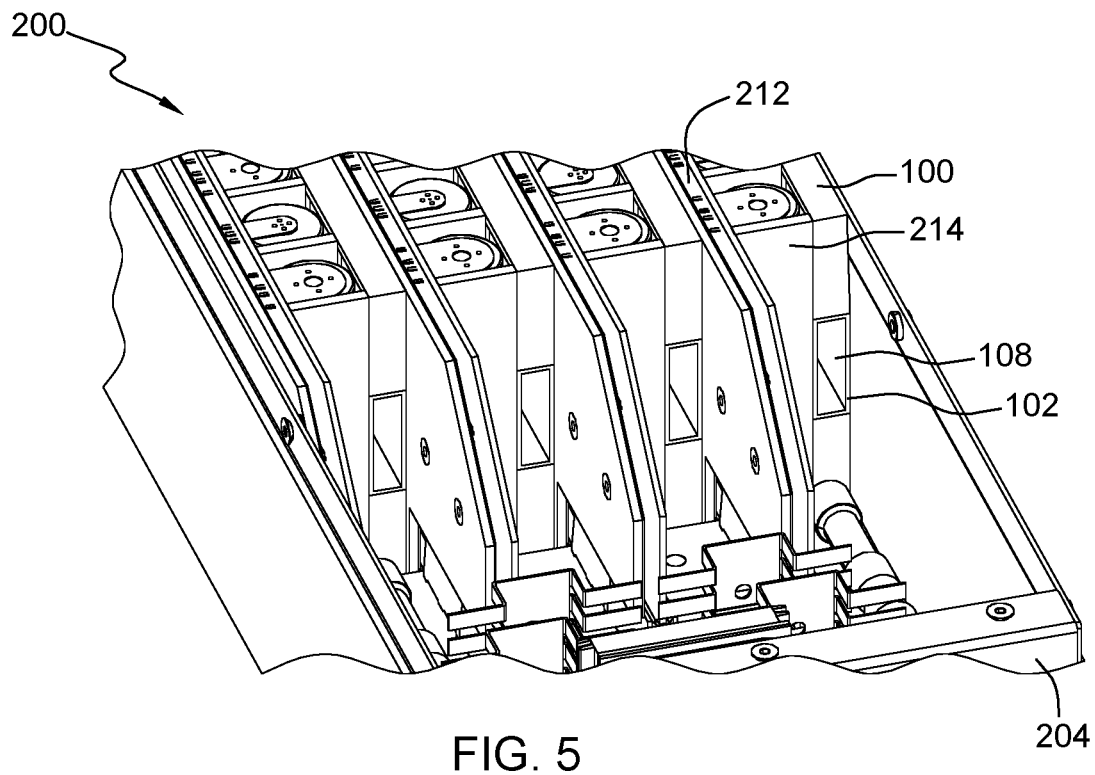
FIG. 5 depicts a front inlet view of the plurality of air plenum assemblies in the battery cell package of FIG. 2, in accordance with one embodiment of the present invention.

FIG. 5 depicts a front inlet view of the plurality of air plenum assemblies in the battery cell package of FIG. 2, in accordance with one embodiment of the present invention. In this embodiment, cooled or ambient air is forced through each inlet 108 of each cooling plenum 102 of air plenum assembly 100 at front portion 204 of battery cell package 200. The cooled or ambient air forced through each inlet 108 disperses into each compartment housing battery cell 216 of each printed circuit board assembly 212. Each of the four inlets 108 represent a directed path through which the forced cooled or ambient air can take due to thermal separators 214, a bottom surface of battery cell package 200, and a top surface of battery cell package 200 (not illustrated in FIG. 5) preventing the leaking of the forced cooled or ambient air into other surrounding areas.

Figure 6:
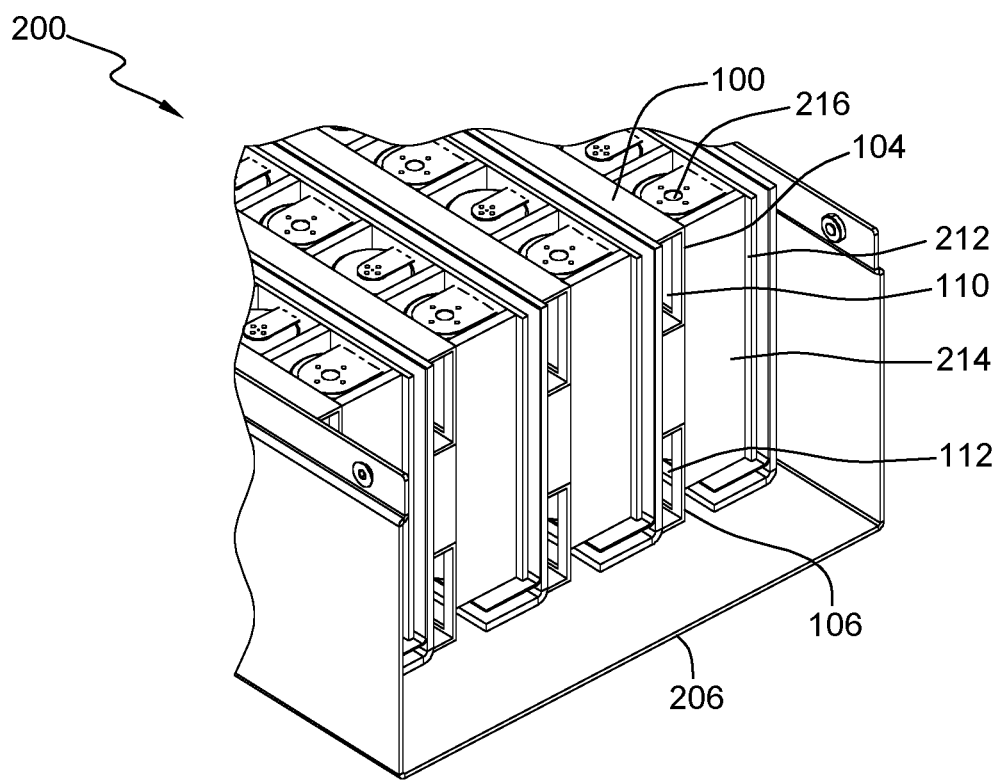
FIG. 6 depicts a rear outlet view of the plurality of air plenum assemblies in the battery cell package of FIG. 2, in accordance with one embodiment of the present invention.

FIG. 6 depicts a rear outlet view of the plurality of air plenum assemblies in the battery cell package of FIG. 2, in accordance with one embodiment of the present invention. In the embodiment, heated air is forced through top outlet 110 of top exhausting plenum 104 and bottom outlet 112 of bottom exhausting plenum 106 towards rear portion 206 of battery cell package 200. As air is forced into air plenum assembly 100 and dispersed into each compartment housing battery cell 216, the air is impinged onto each battery cell 216. The heated air is exhausted out of each compartment housing battery cell 216 and through top exhausting plenum 104 and bottom exhaust plenum 106. Each of the four top outlets 110 and each of the four bottom outlets 112 exhaust the heated air out of rear portion 206 of battery cell package 200. Battery cell package 200 includes a rear wall at rear portion 206 with venting outlets (not illustrated in FIG. 6), for exhausting the heated air out of battery cell package 200. Thermal separator 214 prevents backflow of heated air exhausted out of top outlet 110 and bottom outlet 112 from recirculating back onto the final battery cell 216 of each printed circuit board assembly 212.

The terminology used herein is for the purpose of describing particular embodiments only and is not intended to be limiting to the invention. As used herein, the singular forms "a", "an" and "the" are intended to include the plural forms as well, unless the context clearly indicates otherwise.

Having described preferred embodiments of a cooled containment compartment for package battery cells (which are intended to be illustrative and not limiting), it is noted that modifications and variations may be made by persons skilled in the art in light of the above teachings. It is therefore to be understood that changes may be made in the particular embodiments disclosed which are within the scope of the invention as outlined by the appended claims.

What is claimed is:

1. An apparatus for cooling and containing packaged battery cells, the apparatus comprising:
   a first plenum enclosed by a first conduit for cooling, wherein the first plenum includes an inlet for air intake located at a first side of the first plenum;

a second plenum enclosed by a second conduit for exhausting heated air, wherein the second plenum includes an outlet for exhausting air located at a first side of the second plenum, wherein a second side of the first plenum is at least partially coupled lengthwise to a second side of the second plenum;

a first aperture located on a third side of the first plenum for directing air from the inlet at the first side of the first plenum into a first compartment, wherein the first compartment includes a first battery cell, wherein dimensions and shape of the first aperture are based on cooling requirements of the first compartment that include:

a location of the first aperture on the third side of the first plenum for creating an induced air pressure gradient to exhaust air away from the first battery cell in the first compartment; and a first vent located on a third side of the second plenum for exhausting air away from the first compartment towards the outlet at the first side of the second plenum.

2. The apparatus of claim 1, wherein the inlet at the first side of the first plenum is located opposite to the outlet at the first side of the second plenum.

3. The apparatus of claim 2, wherein the first compartment comprises:

a first printed circuit board assembly electrically coupled to the first battery cell;

a first thermal separator coupled to the first printed circuit board assembly, wherein the first thermal separator aligns with a first side of the first vent and the first printed circuit board aligns with a second side of the first vent; and a second thermal separator coupled to the first printed circuit board assembly, wherein the second thermal separator aligns with a third side of the first vent.

4. The apparatus of claim 3, wherein the first compartment further comprises:

a first side of an enclosure located perpendicular to a first side of the first thermal separator and a first side of the second thermal separator, wherein the first of the first thermal separator and the first side of the second thermal separator create a first seal with the first side of the enclosure; and a second side of the enclosure located perpendicular to a second side of the first thermal separator and a second side of the second thermal separator, wherein the second of the first thermal separator and the second side of the second thermal separator create a second seal with the second side of the enclosure.

5. The apparatus of claim 4, wherein the first compartment is formed by the first printed circuit board assembly, the first thermal separator, the second thermal separator, the first side of the enclosure, the second side of the enclosure, the first side of the first plenum, and the first side of the second plenum.

6. The apparatus of claim 5, wherein the cooling requirements include a location of the first aperture on the third side of the first plenum for impinging air onto the first battery cell located in the first compartment.

7. The apparatus of claim 1, wherein dimension and shape of the first vent are based on exhaust requirements for the first compartment.

8. The apparatus of claim 1, wherein each of the first thermal separator and the second thermal separator is an electrically non-conductive heat resistant material and of a higher melting point relative to the first battery cell.

9. The apparatus of claim 1, further comprising:

a third side of the enclosure, wherein the third side of the enclosure includes an inlet for directing air towards a fan located in the enclosure, wherein the third side is located adjacent to the inlet at the first side of the first plenum; and a fourth side of the enclosure, wherein the four side of the enclosure is located opposite the third side of the enclosure, wherein the fourth side of the enclosure is located adjacent to the outlet at the first side of the second plenum.

10. The apparatus of claim 2, further comprising:

a third plenum enclosed by a third conduit for exhaust heated air, wherein the third plenum includes an outlet for exhausting air located at a first side of the third plenum; and a first vent located on a first side of the third plenum for exhausting air away from the first compartment towards the outlet at the first side of the third plenum.

11. The apparatus of claim 10, wherein the outlet at the first side of the third plenum aligns with the outlet at the first side of the second plenum.

12. The apparatus of claim 10, wherein the third plenum is at least partially coupled lengthwise to the first plenum, opposite the second plenum.

13. The apparatus of claim 3, further comprising:

a second aperture located on the third side of the first plenum for directing air from the inlet at the first side of the first plenum to a second compartment, wherein the second aperture is adjacent to the first aperture; and a second vent located on the third side of the second plenum for exhausting air away from the second compartment towards the outlet at the first side of the second plenum, wherein the second vent is adjacent to the first vent.

14. The apparatus of claim 13, wherein the second compartment comprises:

a second battery cell electrically coupled to the first printed circuit board assembly; and a third thermal separator coupled to the first printed circuit board assembly, wherein the third thermal separator aligns with a first side of the second vent.

15. The apparatus of claim 13, wherein the first compartment includes a first side of the second thermal separator and the second compartment includes a second side of the second thermal separator.

16. The apparatus of claim 1, wherein the first plenum tapers towards a fourth side of the first plenum opposite the first side of the first plenum.

17. The apparatus of claim 1, wherein the second plenum tapers towards a fourth side of the second plenum opposite the first side the second plenum.

18. The apparatus of claim 10, wherein the third plenum tapers towards a fourth side of the third plenum opposite the first side of the third plenum.

* * * * *